FIG. 1

INVENTOR.
RONALD A. BRUDI

April 5, 1960

R. A. BRUDI 2,931,531

LIFT TRUCK ATTACHMENT

Filed Dec. 26, 1957

INVENTOR.
RONALD A. BRUDI
BY
*J. E. Wiessler*
ATTY.

INVENTOR.
RONALD A. BRUDI

April 5, 1960

R. A. BRUDI 2,931,531

LIFT TRUCK ATTACHMENT

Filed Dec. 26, 1957

*INVENTOR.*
RONALD A. BRUDI
BY
*J.C. Wiessler*
ATTY.

United States Patent Office 2,931,531
Patented Apr. 5, 1960

2,931,531
LIFT TRUCK ATTACHMENT

Ronald A. Brudi, Battle Creek, Mich., assignor to Clark Equipment Company, a corporation of Michigan Application December 26, 1957, Serial No. 705,386

7 Claims. (Cl. 214—750)

This invention relates to an attachment device for lift trucks, and more particularly to an attachment for automatically loading and unloading articles in bins or racks which may be located at either or both sides of the truck.

Material handling operations in warehouses and manufacturing plants, for example, ofttimes require a vehicle which can navigate an aisle between tiered rows of bins or racks in which materials are stored and which is capable of loading and unloading such material without turning the vehicle. Such material may be stored on roller conveyors suitably mounted in the bins or racks to facilitate ease of handling.

In carrying out the present invention I have devised an improved roll-off and roll-on accessory for use with industrial lift trucks which is capable of shifting laterally of the truck in both directions to either remove material from or deposit it in bins or racks as aforesaid. Power driven rollers are associated with the accessory device for moving the material on or off the device and a novel safety stop mechanism is associated with the device for automatically limiting the extent of movement of the material in one direction when it is shifted by the rollers laterally of the truck in said one direction. By means of this invention a truck operator can maneuver a truck along a narrow aisle located between tiered material storage racks, and select material from any given rack within the range of movement of the accessory by lifting same to a desired height on the lifting mast of the truck and then shifting the accessory laterally to one side of the aisle so as to engage an edge portion of the under surface of such material by means of the powered rollers, whereafter the rollers may be driven in a direction to transfer the material from the rack to a supporting bed portion of the accessory, said aforementioned stop means being automatically operable to limit the extent of such movement of the material. After transfer of the material from the rack to the truck attachment, the attachment may be shifted laterally to its original position, then lowered in the mast assembly and transported by the truck to any selected location.

It is an important object of this invention to provide a generally improved material handling device which is particularly well adapted for use with industrial lift trucks and which is capable, for example, of moving laterally to either side of an aisle formed between storage bins or racks to engage and transfer stored material to the device for transport by the truck.

An important feature of this invention is the provision in such a device of stop means automatically operable upon lateral movement of the device to limit lateral movement of material engaged by the device.

Another feature of this invention is the provision of a safety device for interrupting the supply of power to power driven elements of the accessory device whenever a mispositioned load is partially engaged by the accessory device.

Another object of this invention is to improve generally the construction and operation of lift truck attachments of the type herein described.

Other objects, advantages and features of this invention will readily appear to persons skilled in the art following the detailed description of one embodiment thereof taken in conjunction with the drawings wherein:

Referring now, in detail, to the figures, the numeral 10 illustrates generally a stand-up rider type electric powered lift truck of well-known type having a body portion 12 in which is housed a battery and associated parts, including electric motor means, for driving a dirigible traction wheel, not shown, located at the rear of the truck. A pair of laterally spaced trail wheels, one of which is shown at numeral 14, are located at the forward end of the truck.

A telescoping lifting mast of well-known construction is illustrated at numeral 16 and generally comprises a pair of laterally spaced fixed outer guide members 18 within which is nested for vertical sliding movement an inner slide structure 20 which includes a pair of laterally spaced channel members telescoped within fixed guides 18. A hydraulic hoist motor 22 is secured at the cylinder end thereof to the base portion of the lifting mast and at the piston rod end thereof to a crosshead 24, at each opposite side of which is attached sprocket and chain means 26 and 28. Each chain is anchored at one end to a brace member 30, which is connected between the fixed guides 18, and at the opposite end to a carriage member of an attachment device 32. Various manipulatable controls, including a steering wheel 34, are provided in the operator's station on the truck to control movement of the truck, vertical movement of attachment 32 relative to the lifting mast, and operation of certain components of the accessory as will be described below. The construction described so far is well known in the art and need not be further amplified.

The construction of attachment device 32 will now be described in detail. A transversely extending supporting plate or carriage 40 is located forwardly of the outer guide members 18 and is supported for guided vertical movement in the channel members of inner slide structure 20 by well-known bracket and roller means, not shown. A metal box-like structure 46 having a rearwardly protruding inverted L-shaped bracket member 48 extending along an upper edge thereof is operatively connected to the carriage 40 for guided lateral movement relative thereto by means of upper, central and lower pairs of laterally spaced rollers 50, 52 and 54, respectively. The rollers 50 are connected to a bar member 56, which is secured to and protrudes forwardly from the upper edge of carriage 40, by stub shafts 57 for rotation about vertical axes, and the rollers 54 are similarly mounted on a transverse bar member 58 for rotation in a horizontal plane adjacent the lower edge of carriage 40. The rollers 52, on the other hand, protrude forwardly from the lower-central portion of carriage 40 for rotation in a vertical plane about the axes of stub shafts 59. A horizontally extending channel member 60 is secured to the rear plate member of box section 46 for receiving the rollers 52 in the pocket thereof. Rollers 50 are mounted for rolling engagement with the inner surface of the downwardly depending portion of bracket 48, and rollers 54 are mounted for rolling engagement with a lower rear leg portion of a transverse hollow support member 64 which has an inverted U-shaped cross section. The support member 64 extends outwardly beyond opposite sides of box section 46 and is secured along a raised central portion 65 thereof to the lower edge of the box section.

A framework forming a material handling bed extends forwardly of hollow support member 64 and comprises generally a transversely extending plate 66 of a length approximately equal to the length of member 64 and supported in horizontally spaced relation to member 64 by a plurality of longitudinally extending and laterally spaced inverted L-shaped channel members 68, as well as by a pair of plate members 70 located adjacent opposite ends of the framework. Secured by a plurality of studs 71 to the outer face of plate member 66 is a transverse channel member 72 forming a chamber 74 with member 66.

Figure 6:
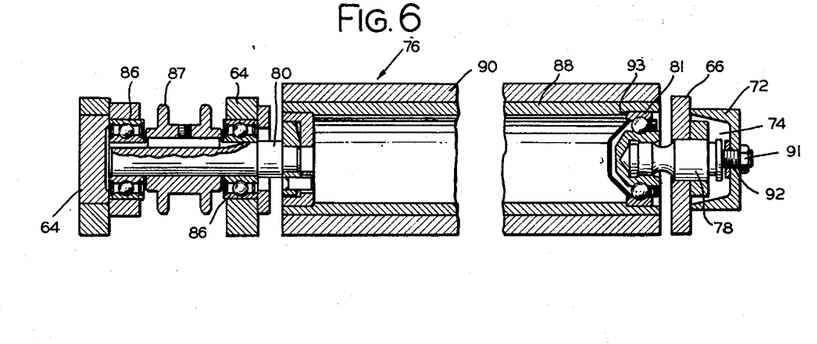
Figure 6 is an enlarged longitudinal sectional view of a roller and mounting therefor taken along line 6—6 of Figure 2.
Figure 7:
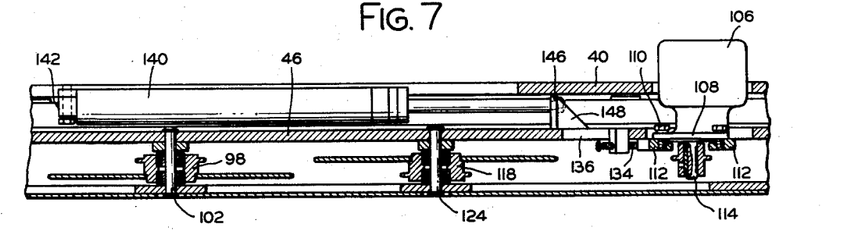
Figure 7 is a sectional view taken along line 7—7 of Figure 2.

A plurality of longitudinally extending and laterally spaced rollers 76 are mounted for rotation between the members 64 and 66, 72 (Figure 6). Each roller is mounted on a pair of shafts 78 and 80 which extend outwardly from opposite ends thereof. Interposed between the one end of each roller 76 and shaft 78 is a ball bearing 81, each shaft 78 being non-rotatably mounted in members 66 and 72. Each shaft 80 is secured along a reduced section thereof to the opposite end of a roller and is mounted for rotation in a pair of longitudinally spaced ball bearings 86 which are mounted in and on opposite legs of U-shaped member 64. Mounted and keyed on each shaft 80 between each pair of bearings 86 is a double sprocket 87 adapted to transmit power to rotate the rollers in a manner to be described. Each roller element includes a cylindrical core member 88 and a cylindrical friction facing member 90 which is secured to the outer periphery of the core. A nut and stud 91 and 92 of each shaft 78 is adapted to adjust the longitudinal play of the roller assembly. In the latter connection it will be noted that bearing 81 abuts a shoulder 93 of roller core 88.

The right hand pair of rollers 76 (as viewed in Figures 2 and 4) are drivably connected by an endless chain 94 which is reeved over the rear sides of the associated sprockets 87. The left hand pair of rollers are drivably connected by a chain 95 reeved over the forward sides of the associated sprockets 87. The right-central pair of rollers 76 are drivably connected by a third endless chain 96 reeved over the forward sides of the associated sprockets 87, whereas the left-central pair of rollers 76 are drivably connected to each other and to the small wheel of a double sprocket 98 by an endless chain member 100 which is reeved over the rear sides of the associated sprockets 87 and the small wheel of sprocket 98. The sprocket 98 is mounted for rotation by means of roller bearings 104 upon a stationary stub shaft 102 within the hollow chamber of box section 46.

A reversible hydromotor 106 of any known suitable type is supported by a flange plate and bolts 108 and 110 upon a generally triangular adjustable plate member 112, said plate member being pivotally secured to and depending downwardly from a bolt member 113 located at the apex of the plate member. The bolt 113 is secured to the rear plate of box section 46, said hydromotor having a drive shaft 114 extending into the chamber of said box section for driving either in a clockwise or counterclockwise direction a relatively small diameter sprocket 116. A motor driven pump, not shown, supplies hydraulic fluid under pressure to drive hydromotor 106, operator controlled valve means, not shown, being provided in the circuit between the pump and hydromotor to permit operator selection of hydromotor operation in either direction. The sprocket 116 is drivably connected to a large wheel of a double sprocket 118, which is mounted for rotation on a stub shaft 124, by means of an endless chain 120. A small diameter wheel of sprocket 118 is connected to the large diameter wheel of sprocket 98 by a chain 122.

The base portion of triangular plate member 112 has formed therein a pair of laterally spaced curved adjustment slots 130 which are connected to the back portion of box section 46 by means of a pair of bolts 132, said bolts and slots together permitting pivotal movement of plate 112 about bolt 113. The tension of chain 120 may be adjusted by adjustment of a bolt 134 which is mounted in an opening 136 of the back plate member of box section 46 and which abuts the left edge of plate 112. The bolt 134 may be adjusted in or out to pivot plate 112 on bolt 113, such movement being permitted by slots 130.

Figure 2:
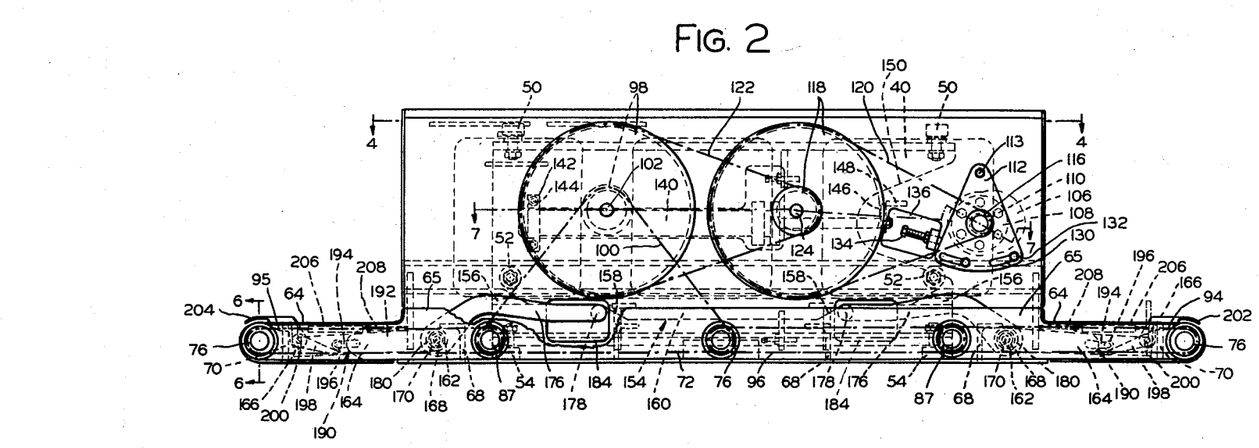
Figure 2 is a sectional view of the attachment device taken along line 2—2 of Figure 3.
Figure 3:
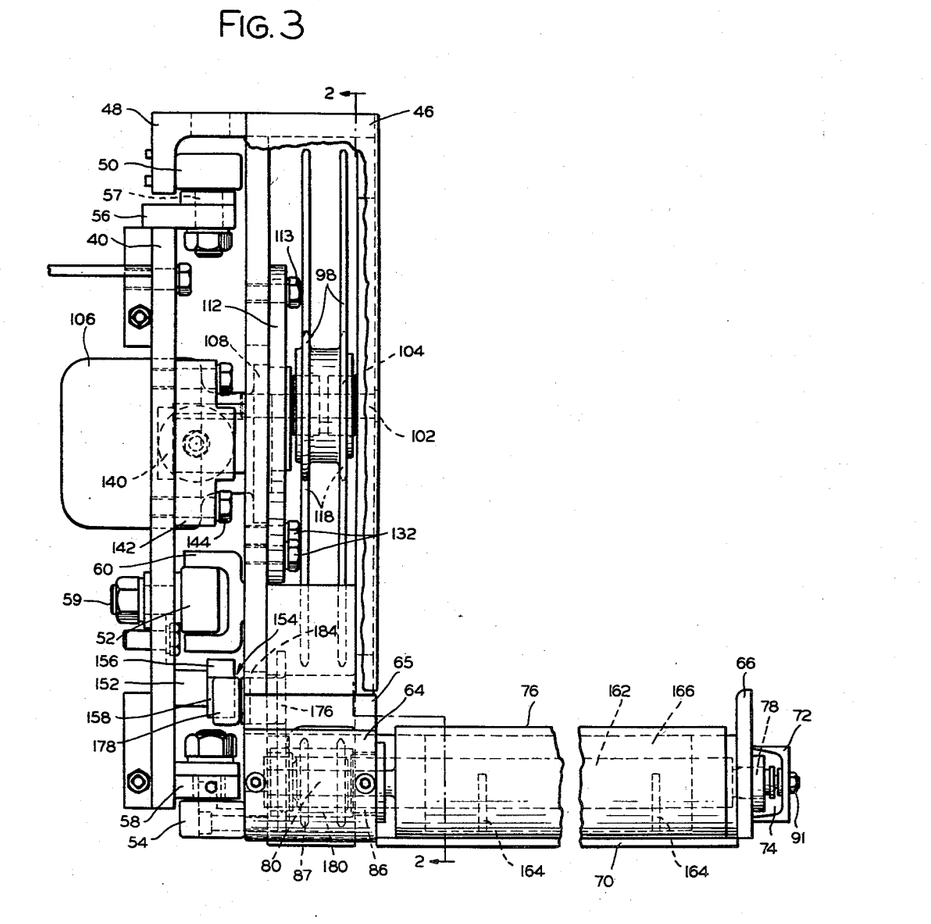
Figure 3 is an enlarged view in elevation taken from the left end of Figure 2 with the side cover plate portion broken away to facilitate understanding.

From the above it will be seen that when the hydromotor 106 is energized to rotate drive sprocket 116 in a counterclockwise direction, for example, as viewed in Figure 2, the left-central pair of double sprockets 87 and the corresponding pair of rollers 76 are caused to be rotated in a like direction by the chains 120, 122 and 100 driving through the double sprockets 118 and 98. The rotational speed of said rollers relative to the rotational speed of drive sprocket 116 is, of course, dependent upon the ratios of wheel diameters in the drive train from sprocket 116 to said sprocket 87. As illustrated, it is apparent that the rotational speed of the rollers will be substantially less than that of the motor driven sprocket 116, due to the speed reduction between sprockets 116 and 118, and again between sprockets 118 and 98. The speed ratio can, of course, be varied in design as desired. The said left-central pair of sprockets 87 causes the other sprockets 87 and rollers 76 to be driven in the same direction and at the same rotational speed as the left-central rollers by means of the chains 94, 95 and 96, all of said sprockets and rollers 87 and 76, respectively, being of equal respective diameters. Rotation of the drive sprocket 116 is a clockwise direction effects a like rotation of the various rollers 76 by causing clockwise rotation of the sprockets 98 and 118.

The box section 46 is actuatable laterally in either direction, along with the support member 64 therefor, the rollers 76 and roller framework, and the hydromotor and roller drive train supported by the box section 46, by means of an hydraulic cylinder and piston assembly 140 which is secured at the cylinder end to carriage 40 by means of an anchor block and bolts 142 and 144 and at the piston rod end to the rear plate of box section 46 by a bracket means consisting of a pair of perpendicularly related plates 146 and 148. Edge portions of the bracket members 146 and 148 are attached, as by welding, to the rear surface of the rear plate of box structure 46. The cylinder-piston assembly is double-acting and may be connected in known manner to a source of fluid pressure, not shown, for actuating the bracket means 146, 148 with the piston rod either to the right or to the left, whereby to actuate laterally of the truck in either direction the attachment device, as aforesaid, on the rollers 50, 52 and 54. It will be noted that the right hand side of carriage 40 employs a cut-out section 150 (Figure 2) for permitting movement in either direction of the hydromotor 106 without interference. The extent of lateral movement of the attachment device is limited by the length of the cylinder-piston assembly 140.

Figure 8:
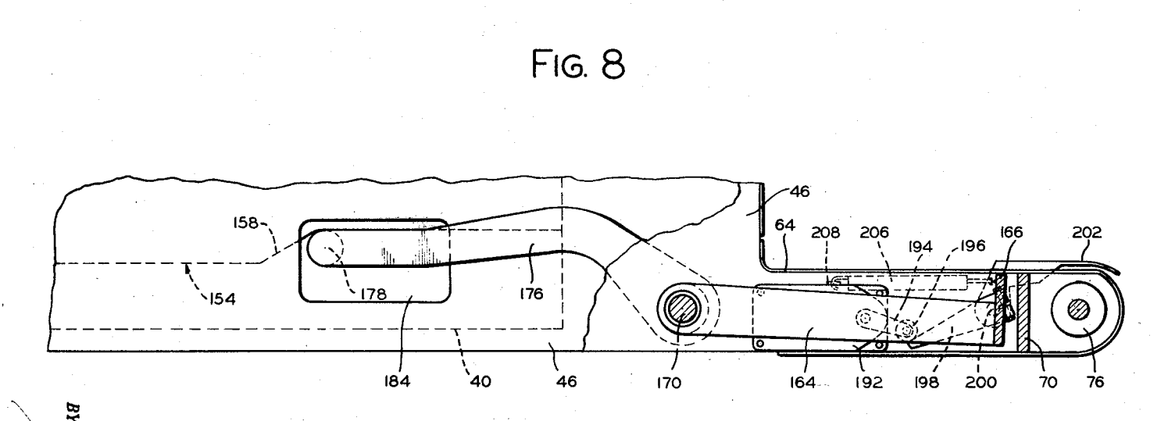
Figure 8 is a broken-away enlarged partial front view which illustrates that portion of my device which includes the stop and cam mechanism together with the switch device.
Figure 9:
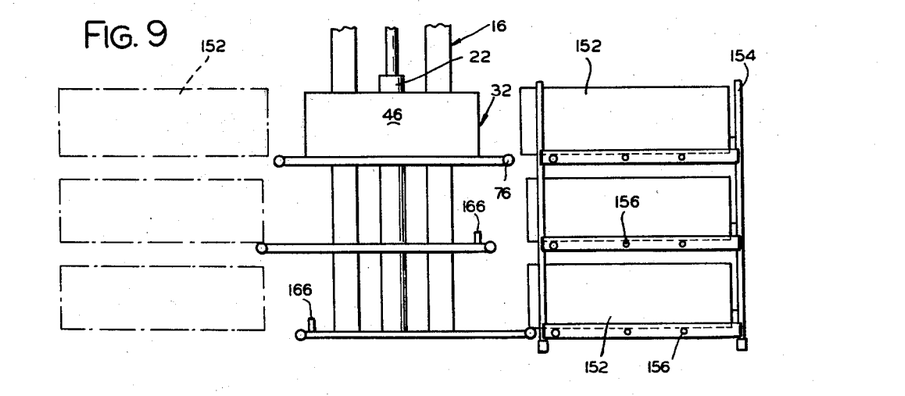
Figure 9 is a schematic view illustrating generally one mode of operation of the attachment when it is located with the lift truck in an aisle formed between tiered material container racks.

Referring now particularly to Figure 8, there is diagrammatically illustrated a plurality of material containers 152 tiered in vertically spaced relation upon a rack means 154, which may include at each vertical level thereof a plurality of spaced non-power driven rollers 156 located between the sides of the rack for rolling engagement with the bottom surface of a container 152.

The truck 10 may be driven along an aisle formed between such racks for the purpose of transferring a container 152 either from a given position in the rack to the roller bed of the attachment device, or from the roller bed to any selected location in the rack on either side of the aisle. Transfer from the rack to the roller bed may be accomplished, following location of the truck and roller bed adjacent a selected container 152, by first actuating the roller bed and associated structure laterally of the truck so as to engage one of the outer rollers 76 beneath the bottom edge portion of the selected container, following which the hydromotor 106 and rollers 76 are rotated in a direction which causes the container 152 to move from the rack to the roller bed as the friction linings 90 of the rollers engage successively the bottom surface of the container. The latter step of the above procedure is, of course, reversed when it is desired to transfer a container from the roller bed to a selected location in the rack, the rollers being rotated in a direction to roll the container into the rack on rollers 156.

In order to minimize the possibility of accidents occurring during transfer of a container to the roller bed, I have provided a safety stop mechanism in the attachment device which is described below. The purpose of the safety mechanism is to eliminate the possibility that a container might be rolled off the far side of the roller bed by an inattentive or unskilled operator, for example, during transference from the rack.

Extending lengthwise of carriage 40 and secured thereto by a bar member 152 is an elongated cam 154 mounted vertically between roller sets 52 and 54 adjacent the rear plate of box section 46. The cam 154 comprises relatively thin elongated sections 156 at opposite end portions, sloping sections 158 converging toward the center of the cam, and a horizontal central section 160 forming a relatively thick cam portion between the sloping sections 158. Nested partially within each of the outwardly opening angle support members 68 of the roller bed framework is a longitudinally extending shaft 162 to which is secured, as by welding, a pair of laterally extending and longitudinally spaced supporting members 164 which are connected together at the outer ends thereof by a longitudinally extending stop plate member 166. Each stop member 166 is normally nested below the upper peripheral portions of the rollers 76 and within the open pocket of the roller bed which is formed between the adjacent angle member 68 and the corresponding end support member 70.

Figure 5:
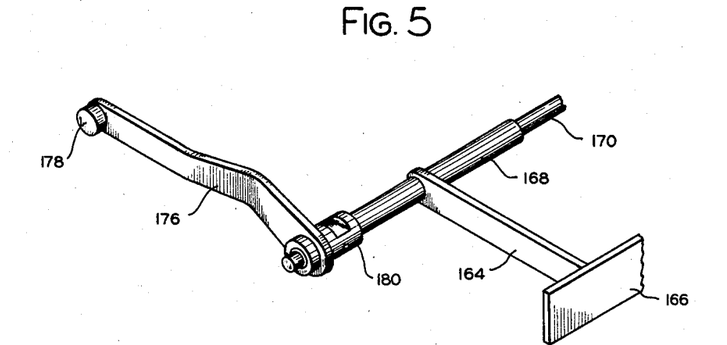
Figure 5 is a view in perspective of a portion of the stop mechanism which is associated with my device.

Each shaft member 162 includes a sleeve portion 168 and a core portion 170 (Figure 5). The core portion passes through box section 46, being rotatably supported at its rear end in a bearing portion 172 of the rear plate of the box section and at its forward end in a bearing portion 174 of plate member 66. Each of the shaft members 162 is connected to cam 154 by an inwardly extending follower arm 176 and a cylindrical follower element 178 connected to the inner end of the arm. The outer end of each follower arm is secured to a boss 180 located within the open section of box member 46 and suitably secured to the sleeve 168 of shaft 162. A pair of latterally spaced openings 182 are provided in the front plate of the box section 46 for permitting passage of shaft members 162 into the box section. Laterally spaced openings 184 are provided in the lower portion of the rear plate of box section 46 adjacent each end portion 156 of the cam 154. Each follower arm 176 first extends upwardly and inwardly to clear the adjacent sprocket 87, and then bends rearwardly and inwardly through one of openings 184. The follower elements 178 of arms 176 are mounted for sliding connection with opposite portions of cam 154. The weight of each stop plate member 166 acts through the supporting lever arms 164 to maintain the respective follower element 178 in abutment with the surface of cam 154 at all times.

The shafts 162, stop members 166, follower arms 176, and associated parts are actuatable laterally with the movable load supporting portion of the attachment, which causes cam follower elements 178 to follow the contoured surface of cam 154. When the movable portion of the attachment is located centrally of the carriage 40, the elements 178 are positioned at the inner ends of the end portions 156 of the cam, as best illustrated in Figure 2. If the piston rod of cylinder assembly 140 is now extended, the movable load supporting portion of the attachment will be actuated rightwardly thereby causing the left cam follower to move downwardly and inwardly along the left hand sloping portion 158 of the cam, whereby to effect a clockwise rotation of left hand shaft 162 which causes a like rotation of the left hand stop plate 166. At the same time the right cam follower moves outwardly along the right end portion 156 of the cam, and thus has no effect on the vertical position of the right hand stop plate 166. Clockwise rotation of left hand stop member 166 causes it to be projected substantially above the upper peripheral portions of the various rollers 76. Further extension of the piston rod causes the left hand cam follower to move along the lower horizontal surface of cam portion 160, thereby maintaining the left hand stop plate in a raised position while the other stop remains in a lowered position.

Retraction of the piston rod of assembly 140 from its extended position actuates the load supporting portion of the attachment leftwardly to first cause the left cam follower to move leftwardly along cam portion 160, and then upwardly along sloping portion 158, during which latter movement the left hand stop plate is lowered below the upper peripheral portions of rollers 76. Further retraction of the piston rod causes the right hand cam follower to be actuated downwardly and inwardly along the right hand sloping portion 158 of the cam as the left hand follower travels along the upper flat portion 156 of the cam, thereby causing the right hand stop plate 166 to be actuated upwardly to the broken line position illustrated in Figure 2.

From the above it will now be apparent that actuation of the roller bed attachment to the right, as illustrated in the lower portion of Figure 8, causes the left hand stop plate 166 to be raised as aforesaid, whereas actuation of the attachment to the left, as shown in the center portion of Figure 8, causes the right hand stop member to be similarly raised from its normally lowered position. Thus, when the rollers 76 are rotated in a counterclockwise direction with the attachment located to the right of center, a material container 152 can be actuated leftwardly across the roller bed until such movement is interrupted by contact of the container with the left hand stop plate 166. Similarly, right hand stop member 166 interrupts rightward movement of a load when the attachment is located left of center to engage the load.

During movement of a container with the truck from one location to another the rollers 76 provide non-rotatable friction surfaces which engage the bottom side of the container, the rollers being maintained in fixed position by the chains interconnecting same with the stationary power drive originating at the hydromotor 106.

Figure 1:
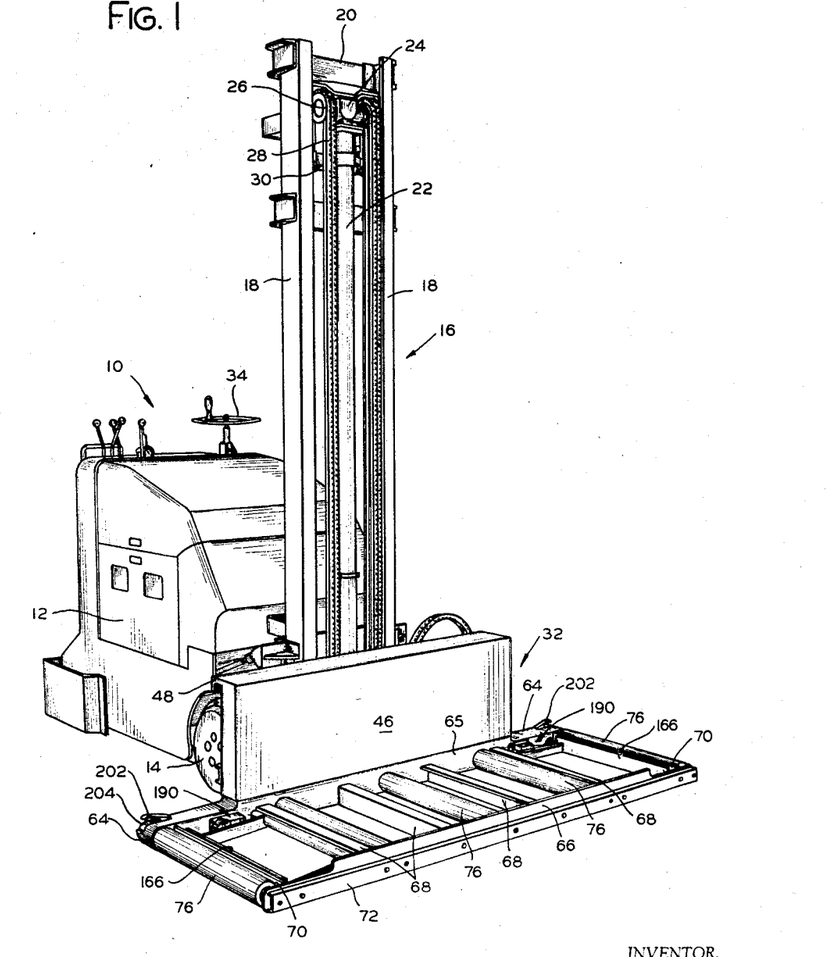
Figure 1 is a view in perspective of an industrial lift truck with which the device of my invention is associated.
Figure 4:
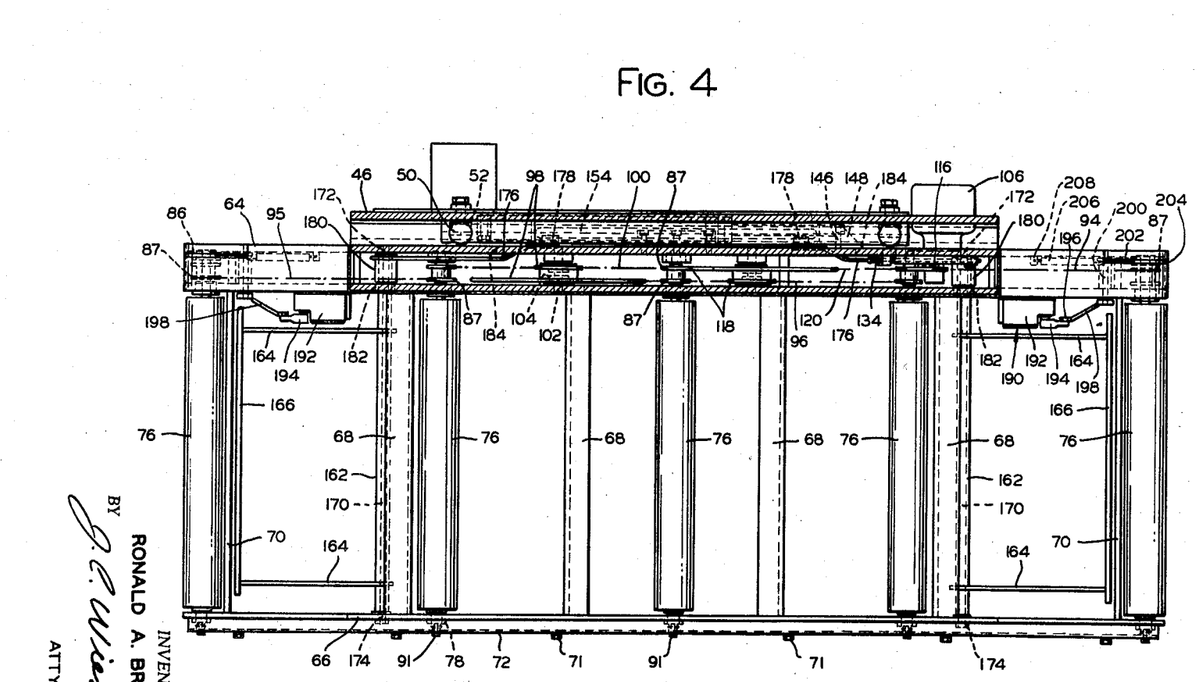
Figure 4 is a sectional view taken along line 4—4 of Figure 2.

In Figures 1, 2 and 4 there is illustrated generally at numeral 190 a pair of switch devices adjacent opposite ends of the roller bed which provide a second safety feature, as will be explained. Referring to Figure 8, it will be understood that each row of racks 154 which forms one side of the aisle in which the truck travels, normally extends a considerable distance. Containers 152 are, as a rule, mounted lengthwise of each row of racks in close side by side relationship, and it may happen that an operator of my attachment, when preparing to engage a load, sideshifts it such that the engaging roller contacts not only the intended container, but also the corner portion of a container adjacent the intended one. Under these circumstances rotation of the rollers 76 will not only transfer the intended container from the rack to the roller bed, but will also tend to move the next adjacent container out of its location in the rack.

Following transfer of the intended container to the roller bed, it is understood that the roller bed is normally shifted laterally away from the rack to a central position relative to the truck. Now if such an adjacent container has been unintentionally moved partially out of the rack by rotation of the engaging outer roller 76, as aforesaid, and is then moved further out from the rack by the sideshifting action of the attachment, it will be appreciated that the container will project outwardly into the aisle, and, under certain circumstances, may reach a position from which it is caused to fall to the floor under the influence of gravity. The switch mechanism 190 is intended to prevent such an occurrence from happening.

Each of the switch assemblies 190 comprises a switch box 192 having an electric on-off switch therein, not shown, which is located in the electrical supply circuit of an electric motor, not shown, which drives the supply pump of cylinder-piston assembly 140. The switch 190 may be of any well known type for the purpose, such as type TUB4-B1 manufactured by the Square D Company. This switch is normally maintained in a circuit closing position by a spring loaded arm 194 which extends outwardly of the casing of each switch. A roller 196 is connected to the outer end of each arm. Each roller 196 abuts one end of a lever arm 198 mounted upon a rotatable stub shaft 200 which is mounted in the space between the legs of the inverted U-shaped frame member 64 adjacent opposite ends thereof. Spaced longitudinally rearwardly of each arm 198 on stub shaft 200 is a projecting arm 202 which extends upwardly through an opening 204 formed in the upper base portion of member 64, the arm 202 then extending laterally outwardly to a position adjacent the outer side of the respective outer roller 76. Each arm 202 is normally held in a raised position, illustrated best in Figure 2, by a tension spring 206 connected at one end to a lug on the arm 202 and at the opposite end to a bracket 208 on member 64. So long as arm 202 is held in the aforementioned position by spring 206, it will be apparent that the lever arm 198 is maintained in a down position on stub shaft 200. However, in the event that the aforesaid condition occurs, for example, wherein an unintended container is pulled out from the rack, the container will contact arm 202 and force it to rotate on shaft 200 against the tension of spring 206, whereby to rotate arm 198 and switch lever 194 upwardly in opposite directions. This action effects circuit opening movement of the switch 190. Thus, if after transferral of the intended container to the roller bed, the operator attempts to pressurize the sideshift cylinder to return the roller bed to a central position, he will discover that the sideshift cylinder is inoperative because of the open circuit to the actuating motor-pump therefor. The operator may then manually, for example, move the unintended container back to its original position in the rack, thereby again closing switch 190, following which the attachment can be returned to central position with the intended load.

If desired, the switch arm 194 can also be made to control a contact switch in the circuit of the supply pump for hydromotor 106. Thus, operation of both the sideshifting means and the rollers would be interrupted whenever arm 202 was depressed.

The necessary pumps, motors and associated circuitry for actuating cylinder-piston assembly 140 and hydromotor 106 may be of well-known construction, and need not be disclosed in detail herein, as will be apparent to anyone skilled in the art.

While I have described a particular embodiment of my invention, it should be understood that various modifications thereof may be made within the spirit of the invention as set forth in the claims.

I claim:

1. Mechanism for moving material containers into and out of bins or racks comprising a carriage means, a generally L-shaped load supporting means mounted for transverse movement on the carriage means, first motor means connected to the carriage means and to the load supporting means for actuating the latter transversely of the carriage means in either direction, a plurality of rotatable elements mounted in transversely spaced relation in the horizontal portion of the L-shaped supporting means, second motor means secured to the supporting means and operatively connected to said rotatable elements for rotating same in a selected direction, stop means mounted adjacent opposite ends of the horizontal portion of said supporting means, and means mounted upon the carriage means cooperating with each said stop means for raising one of said stop means upwardly above and parallel to the upper portion of said rotatable elements during transverse movement of the load supporting means in one direction relative to the carriage means.

2. Mechanism as claimed in claim 1 wherein each said stop means comprises a stop element movable upwardly and downwardly adjacent one end of said horizontal portion and a lever means connected to the stop element and cooperating with a predefined surface of the carriage mounted cooperating means.

3. A mechanism as claimed in claim 1 wherein said carriage mounted cooperating means comprises a transversely extending cam element, and said stop means includes cam follower means cooperating with said cam element during transverse movement of said load supporting means in order to control the position of each said stop means.

4. Mechanism as claimed in claim 3 wherein said cam element and cam follower means cooperate to control the position of each said stop means such that that stop means adjacent the end of the load supporting means at which a load is engaged remains in inoperative position whereas that stop means adjacent the end opposite the load engaging end of the supporting means is actuated to an operative position to limit the extent of movement of the load along the load supporting means.

5. A load handling device comprising carriage means, load supporting means mounted for transverse movement on said carriage means and including a load supporting bed extending forwardly of the carriage means, a plurality of transversely spaced rotatable elements mounted along said load supporting bed, means for rotating said elements to engage and move a load along such supporting bed, means connected to said carriage means and said load supporting bed for actuating said bed transversely of the carriage means, stop means mounted adjacent at least one end of the supporting bed, a transversely extending cam element secured to the carriage means, and a cam follower means connected to said stop means and cooperating with said cam element during transverse movement of the load supporting means such that such transverse movement effects movement of said stop means to a load limiting position.

6. A mechanism as claimed in claim 1 wherein the operative connection between said second motor means and said rotatable elements includes a plurality of power transmitting elements connecting said second motor means to each of the rotatable elements, said power transmitting elements being mounted upon said load supporting means for transverse movement therewith.

7. A mechanism as claimed in claim 1 wherein the operative connection between said second motor means and said rotatable elements is mounted for rotation in the vertical portion of the load supporting means, said vertical portion comprising a box-like structure.

References Cited in the file of this patent

UNITED STATES PATENTS

| | | |
|---|---|---|
| 1,830,740 | Leech et al. | Nov. 3, 1931 |
| 2,614,684 | Daniels | Oct. 21, 1952 |
| 2,633,809 | Robinson et al. | Apr. 7, 1953 |
| 2,713,432 | Lorimer | July 19, 1955 |